United States Patent
Pan

(10) Patent No.: US 12,223,715 B2
(45) Date of Patent: Feb. 11, 2025

(54) METHOD, SYSTEM AND RECORDING MEDIUM FOR ACCESSORY PAIRING

(71) Applicant: HTC Corporation, Taoyuan (TW)

(72) Inventor: Sheng-Yang Pan, Taoyuan (TW)

(73) Assignee: HTC Corporation, Taoyuan (TW)

( * ) Notice: Subject to any disclaimer, the term of this patent is extended or adjusted under 35 U.S.C. 154(b) by 385 days.

(21) Appl. No.: 17/826,173

(22) Filed: May 27, 2022

(65) Prior Publication Data
US 2023/0140030 A1    May 4, 2023

Related U.S. Application Data

(60) Provisional application No. 63/274,963, filed on Nov. 3, 2021.

(51) Int. Cl.
| | | |
|---|---|---|
| G06V 20/20 | (2022.01) | |
| G06T 7/70 | (2017.01) | |
| G06V 10/74 | (2022.01) | |
| G06V 40/10 | (2022.01) | |
| H04N 7/18 | (2006.01) | |

(52) U.S. Cl.
CPC ............... G06V 20/20 (2022.01); G06T 7/70 (2017.01); G06V 10/761 (2022.01); G06V 40/10 (2022.01); H04N 7/183 (2013.01); G06T 2207/30196 (2013.01)

(58) Field of Classification Search
CPC ...... G06V 20/20; G06V 10/761; G06V 40/10; G06T 7/70; G06T 2207/30196; G06T 19/006; H04N 7/183; G06F 3/011; G06F 1/163
See application file for complete search history.

(56) References Cited

U.S. PATENT DOCUMENTS

| | | | | |
|---|---|---|---|---|
| 9,098,129 | B2* | 8/2015 | Ting | G06F 3/038 |
| 9,268,136 | B1* | 2/2016 | Starner | G06F 3/03547 |
| 10,037,085 | B2* | 7/2018 | Anderson | G06T 19/006 |
| 2016/0171675 | A1* | 6/2016 | Tseng | G06F 3/0383 |
| | | | | 345/8 |

(Continued)

FOREIGN PATENT DOCUMENTS

| | | |
|---|---|---|
| CN | 105184268 | 12/2015 |
| CN | 105765516 | 7/2016 |

(Continued)

OTHER PUBLICATIONS

"Office Action of Taiwan Counterpart Application", issued on Feb. 14, 2023, p. 1-p. 10.

*Primary Examiner* — Iriana Cruz
(74) *Attorney, Agent, or Firm* — JCIPRNET

(57) ABSTRACT

A method, a system and a recording medium for accessory pairing are provided. The method comprises: determining a type of the accessory based on the identifying information of an accessory; recognizing a type of a user body part according to an image; in response to the accessory is applicable to the user body part according to the type of accessory and the type of the user body part, obtaining a first position of the accessory within an environment and obtaining a second position of the user body part within the environment; and configuring the accessory to pair the user body part according to the first position of the accessory and the second position of the user body part.

16 Claims, 4 Drawing Sheets

(56) References Cited

U.S. PATENT DOCUMENTS

| | | | |
|---|---|---|---|
| 2017/0244811 A1* | 8/2017 | McKenzie | G02B 27/017 |
| 2019/0025931 A1 | 1/2019 | Anderson | |
| 2021/0239993 A1 | 8/2021 | Wan et al. | |
| 2022/0047333 A1* | 2/2022 | Buil | G06T 7/73 |
| 2024/0062487 A1* | 2/2024 | Palangie | G06F 3/011 |

FOREIGN PATENT DOCUMENTS

| | | |
|---|---|---|
| CN | 107533369 | 1/2018 |
| CN | 110677927 | 1/2020 |
| CN | 113039508 | 6/2021 |
| CN | 113227941 | 8/2021 |
| CN | 113498502 | 10/2021 |

* cited by examiner

METHOD, SYSTEM AND RECORDING MEDIUM FOR ACCESSORY PAIRING

CROSS-REFERENCE TO RELATED APPLICATION

This application claims the priority benefit of U.S. provisional application Ser. No. 63/274,963, filed on Nov. 3, 2021. The entirety of the above-mentioned patent application is hereby incorporated by reference herein and made a part of this specification.

BACKGROUND

Technical Field

The invention relates to a method and a system for virtual reality, and particularly relates to a method, a system and a recording medium for accessory pairing.

Description of Related Art

Virtual reality (VR) is an immersive technology that uses computer simulation technology to generate a virtual world in a three-dimensional (3D) space. A virtual reality system is usually compatible with several accessories, such as controllers, sensors or speakers, to detect user's motion or create an immersive environment. The virtual reality system includes a head-mounted display and a computing device. The computing device is coupled to the head-mounted display and communicates with the accessory. The computing device may collect data from the accessory, and enable the user to interact with virtual objects in the virtual world based on the collect data.

For a wearable or handheld accessory, if the accessory itself does not initially be set to associate with a specific body part (e.g. left hand or right hand), it is usually necessary to manually set the accessory to be associated with the body part which operates the accessory by the user. On the other hand, if the accessory is initially set to associate with the specific body part but the user wears it on the wrong position, it is necessary to change the wearing position of the accessory by the user. However, for some accessories that need to be fixed (with a wrist strap or devil felt), it is especially inconvenient to change the wearing position.

SUMMARY

The application is directed to a method, a system and a recording medium for accessory pairing, which detects a position of an accessory and a position of a user body part for the accessory to pair the user body part, so as to improve the convenience of accessory setting.

The application provides an accessory pairing method. The method comprises: determining a type of the accessory based on the identifying information of an accessory; recognizing a type of a user body part according to an image; in response to the accessory is applicable to the user body part according to the type of accessory and the type of the user body part, obtaining a first position of the accessory within an environment and obtaining a second position of the user body part within the environment; and configuring the accessory to pair the user body part according to the first position of the accessory and the second position of the user body part.

In an embodiment of the application, the step of determining the type of the accessory based on the identifying information comprises: obtaining an accessory type information from the identifying information of the accessory, wherein the accessory type information indicates a function of the accessory; and determining the type of the accessory based on the accessory type information.

In an embodiment of the application, the step of recognizing the type of the user body part in the image comprises: performing an image recognition on the image to recognize the type of the user body part in the image.

In an embodiment of the application, the method further comprises: defining a candidate area of the user body part corresponding to a user in the image; and defining a reference point to indicate a location of the user body part within the environment based on the candidate area.

In an embodiment of the application, the method further comprises: converting coordinates of the reference point in the image into the location of the user body part within the environment.

In an embodiment of the application, the first position of the accessory comprises at least one of a location of the accessory and an orientation of the accessory, and the second position of the user body part comprises at least one of a location of the user lime and an orientation of the user body part.

In an embodiment of the application, the preset condition indicates at least one of a relative location relation and a relative orientation relation between the accessory and the user body part.

In an embodiment of the application, after the step of obtaining the first position of the accessory within the environment and obtaining the second position of the user body part within the environment, the method further comprises: calculating a distance between the location of the accessory and the location of the user body part.

In an embodiment of the application, after the step of obtaining the first position of the accessory within the environment and obtaining the second position of the user body part within the environment the method further comprises: calculating a relative angle between the orientation of the accessory and the orientation of the user body part between the accessory and the user body part.

The application provides a display system for accessory pairing, comprising a head-mounted display (HMD), at least one accessory, and a computing device. The computing device is coupled to the HMD and the accessory. The computing device is configured to determine a type of the accessory based on the identifying information of the accessory. The computing device is configured to recognize a type of a user body part according to an image. In response to the accessory is applicable to the user body part according to the type of accessory and the type of the user body part, the computing device is configured to obtain a first position of the accessory within an environment and obtaining a second position of the user body part within the environment. The computing device is configured to configure the accessory to pair the user body part.

In an embodiment of the application, the computing device is configured to obtain an accessory type information from the identifying information of the accessory, wherein the accessory type information indicates a function of the accessory. The computing device is configured to determine the type of the accessory based on the accessory type information.

In an embodiment of the application, the computing device is configured to perform an image recognition on the image to recognize the type of the user body part in the image.

In an embodiment of the application, the computing device is configured to define a candidate area of the user body part corresponding to a user in the image. The computing device is configured to define a reference point to indicate a location of the user body part within the environment based on the candidate area.

In an embodiment of the application, the computing device is configured to convert coordinates of the reference point in the image into the location of the user body part within the environment.

In an embodiment of the application, the display system further comprises an image capturing device, coupled to the computing device, wherein the image capturing is configured to capture the image and transmit the image to the computing device.

In an embodiment of the application, the first position of the accessory comprises at least one of a location of the accessory and an orientation of the accessory, and the second position of the user body part comprises at least one of a location of the user lime and an orientation of the user body part.

In an embodiment of the application, the preset condition indicates at least one of a relative location relation and a relative orientation relation between the accessory and the user body part.

In an embodiment of the application, after obtaining the first position of the accessory within the environment and obtaining the second position of the user body part within the environment, the computing device is configured to calculate a distance between the location of the accessory and the location of the user body part.

In an embodiment of the application, after obtaining the first position of the accessory within the environment and obtaining the second position of the user body part within the environment, the computing device is configured to calculate a relative angle between the orientation of the accessory and the orientation of the user body part between the accessory and the user body part.

The application provides a non-transitory computer-readable recording medium, configured to record a program, wherein the program is loaded by a processor in a computing device to execute following steps: determining a type of the accessory based on the identifying information of an accessory; recognizing a type of a user body part according to an image; in response to the accessory is applicable to the user body part according to the type of accessory and the type of the user body part, obtaining a first position of the accessory within an environment and obtaining a second position of the user body part within the environment; and configuring the accessory to pair the user body part according to the first position of the accessory and the second position of the user body part.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set for the herein; rather, these embodiments are provided so that this disclosure will satisfy applicable legal requirements.

Figure 1:
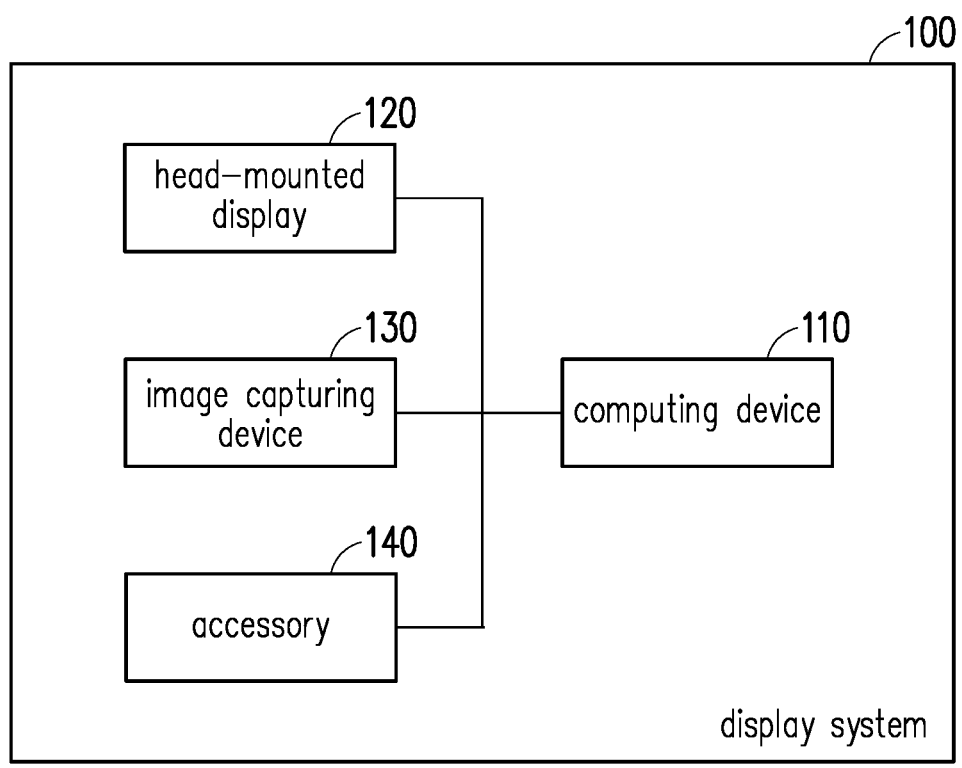
FIG. 1 is a block diagram of a display system for accessory pairing according to an embodiment of the application.

FIG. 1 is a block diagram of a display system for accessory pairing according to an embodiment of the application. Referring to FIG. 1, a display system 100 of the present embodiment includes a computing device 110, a head-mounted display (HMD) 120, an image capturing device 130 and an accessory 140, and functions thereof are respectively described below.

The computing device 110 may be, for example, a server (e.g. a file server, a database server, or an application server), a workstation, a personal computer or a laptop with computing capability and includes a processor. The processor is, for example, a central processing unit (CPU), a graphics processing unit (GPU) or any other programmable microprocessor for general or special use, a digital signal processor (DSP), a programmable controller, an application specific integrated circuit (ASIC), a programmable logic device (PLD) or other similar devices, or a combination of these devices.

The HMD 120 is, for example, a liquid-crystal display (LCD), a light-emitting diode (LED) display or other suitable type of display, which is manufactured in a helmet or an eyeglass form for a user to wear on the head. In the present embodiment, the HMD 120 is coupled to the computing device 110. In an embodiment, the display system 100 may further include at least one locator (not illustrated) which locates a position of the user wearing the HMD 120 within the environment and track the moving position of the user. The locator includes, for example, a laser or an infrared (IR) emitter and receiver, which is adopted to detect a distance of an object in the 3D space, and in collaboration with a plurality of calibrators configured on the object (e.g. the HMD 120), a position of the object in the 3D space can be located. However, the display system 100 may use other positioning technology to locate the HMD 120 and other objects in the environment.

It should be mentioned that in an embodiment, the computing device 110 is disposed separately from the HMD 120, and coupled to the HMD 120 in a wired or a wireless manner for data transmission. In another embodiment, the computing device 110 can also be integrated in the HMD 120, and is connected with the HMD 120 through a transmission line for data transmission, which is not limited by the application.

The image capturing device 130 is coupled to the computing device 110. The image capturing device 130 is, for example, a camera equipped with a charge coupled device (CCD) lens, a complementary metal-oxide semiconductor (CMOS) lens, an infrared lens, or other kinds of lens. Alternatively, the image capturing device 130 may be a camera with a depth information function such as a depth camera or a stereoscopic camera, which is not limited by the application. It should be mentioned that in an embodiment, the image capturing device 130 may be disposed separately from the HMD 120 or integrated in the HMD 120, which is not limited by the application.

The display system 100 is compatible with several different accessories. Each of the accessories may have different functions and generate different input and output data related to the display system 100. For example, the accessory 140 would be an input device such as a handheld controller or a wrist controller equipped with a motion sensor and an infrared (IR) light source (e.g. infrared LED), a mouse, a joystick, a trackball, a touch pad, and/or button that permits the user to interact with environment, objects, or avatars in the virtual world. In another embodiment, the accessory 140 would be a locator that can detect an object in a three-dimensional (3D) space and locate a position of the object in the 3D space with the use of calibrators disposed on the object (e.g., the HMD 120). Detail steps of the method for accessory paring of the application are described below.

Figure 2:
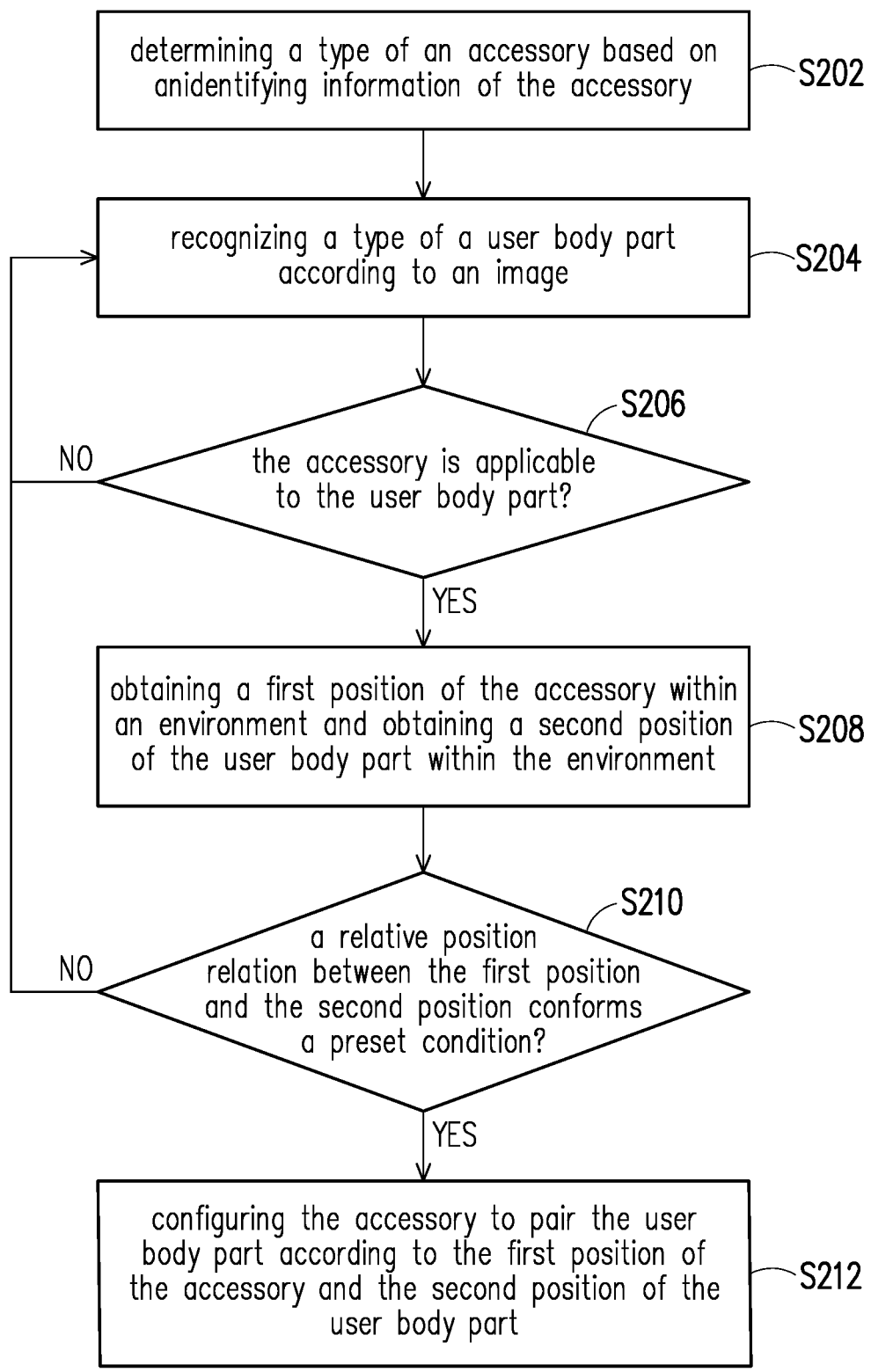
FIG. 2 is a flowchart illustrating a method for accessory pairing according to an embodiment of the application.

FIG. 2 is a flowchart illustrating a method for accessory pairing according to an embodiment of the application. Referring to FIG. 2, the method of the present embodiment is adapted to the display system 100 of FIG. 1, detailed steps of the method for accessory pairing of the application are described below with reference of various components of the display system 100.

First, the computing device 110 receives an identifying information from the accessory 140. The computing device 110 determines a type of the accessory 140 based on the identifying information of the accessory 140 (step S202). In an embodiment, the computing device 110 obtains an accessory type identification from the identifying information of each accessory. The accessory type identifying information can indicate functions of corresponding accessory, so that the accessory with different functions will have different accessory type identification. The computer device 110 can determine the type of the accessory based on the accessory type information. In an embodiment, the identifying information can be transmitted in a standard packet format of Bluetooth protocol or Bluetooth low energy (BLE) protocol from the accessory 140 to the computing device 110, which is not limited by the application.

Back to the flowchart in FIG. 2, the computing device 110 receives an image. The computing device 110 recognizes a type of a user body part according to the image (step S204). The image capturing device 130 can capture images of the user's surroundings. In an embodiment, since the image capturing device 130 can be integrated in the HMD 120 worn by the user, the image capturing device 130 captures the images of a field of view (FOV) of the user. In another embodiment, the image capturing device 130 may capture the images of the user if the image capturing device 130 is disposed separately from the HMD 120. The captured images can be transmitted from the image capturing device 130 to the computing device 110.

The user body part may be a hand, a leg, a head or other body part of the user body. In an embodiment, the computing device 110 can detect and/or track a user body part image corresponding to the user body part in the received images. Specifically, the computing device 110 reads continuous image in an image stream, and detects and tracks a candidate area in the image corresponding to the user body part. The computing device 110 can perform image recognition on the image to define the candidate area corresponding to the user body part in the image and recognize the type of the user body part in the image. The image recognition can be performed by trained deep learning models, neural network models or similar artificial intelligence models. For example, the deep learning model is implemented by a learning network such as a convolution neural network (CNN), which is not limited by the application.

Figure 3:
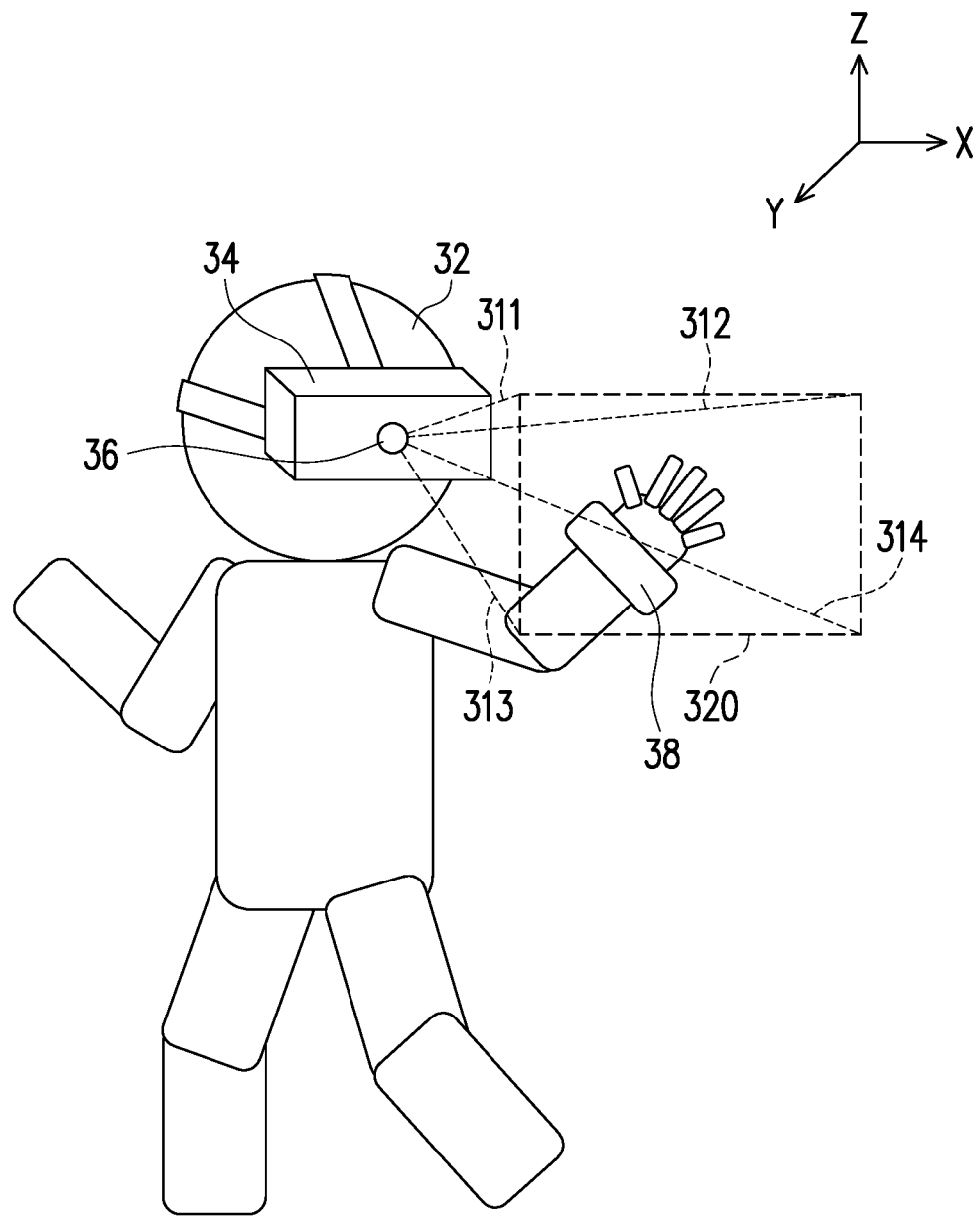
FIG. 3 illustrates an example of a user wearing a head-mounted display and a controller according to an embodiment of the application.
Figure 4:
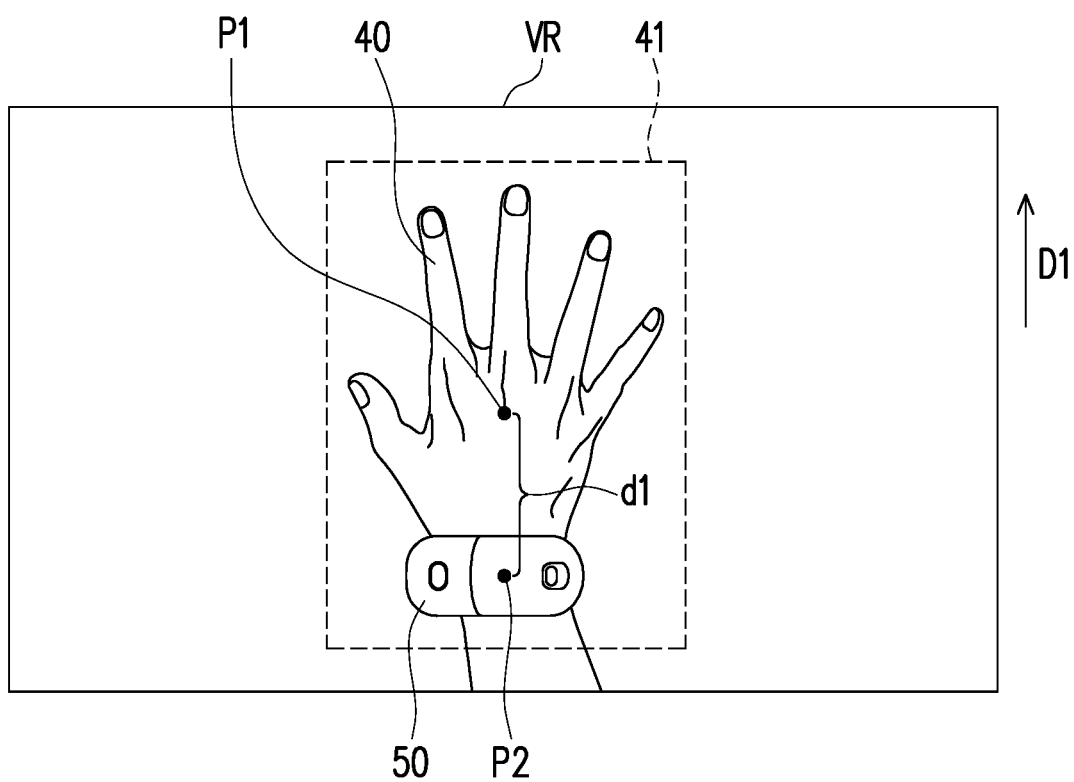
FIG. 4 illustrates an example of detecting a user body part in an image according to an embodiment of the application.

For example, FIG. 3 illustrates an example of a user wearing a head-mounted display and a controller according to an embodiment of the application. FIG. 4 illustrates an example of detecting a user body part in an image according to an embodiment of the application. Referring to FIG. 3, a user 32 in a real-world environment wears an HMD 34 on the head and a wrist controller 38 on the right hand. The user 32 wears the HMD 34 having an image capturing device 36 with a field of view within boundaries 311-314. In this embodiment, when a connection is established between the wrist controller 38 and the computing device 110 of the display system, the computing device 110 can collect an identifying information from the wrist controller 38 and determines a type of the wrist controller 38 based on the identifying information. In this case, the computing device 110 can determine the type "wrist controller" corresponding to the wrist controller 38 according to the identifying information of the wrist controller 38.

In this embodiment, a scene 320 includes the wrist controller 38 and a right hand of the user 32, and the image capturing device 36 can capture the image corresponding to the scene 320. As shown in FIG. 4, an image VR is used as an example for detailed description. The image VR is the image which can be captured by the image capturing device 36, and the image VR can be displayed to the user 32 as a virtual reality image. In this embodiment, the image VR includes a hand image 40 and a wrist controller image 50. After detecting the hand image 40 of the hand in the image VR, the computing device 110 may define a candidate area corresponding to the hand image 40 and define a reference point to indicate a location of the user body part, such as the right hand of the user 32, based on the candidate area. The reference point can be a center point of the candidate area, a center point of an upper boundary of the candidate area or any point in the candidate area, which is not limited by the application. As shown in FIG. 4, the computing device 110 may define the bounding box as the candidate area, and the size of the candidate area is at least large enough to enclose the user body part corresponding to the candidate area. The computing device 110 can set the candidate area 41 to be associated with the hand image 40, and sets the center point of the candidate area 41 as the reference point P1 to indicate the location of the right hand of the user 32.

In addition, the computing device 110 would recognize the type of the hand image 40, and would sets the type to be associated with the candidate area 41. For example, in this embodiment, the computing device 110 may recognize the hand image 40 corresponding to the candidate area 41 and obtain the type "right hand" corresponding to the hand image 40.

Back to the flowchart in FIG. 2, the computing device 110 determines whether the accessory is a candidate device which matches the user body part in the image based on the type of the accessory and the type of the user body part. Concretely, the computing device 110 determines whether the accessory is applicable to the user body part according to the type of accessory and the type of the user body part (step S206). When the accessory is not applicable to the user body part, the procedure would return to step S204 such that the computing device 110 would continue to receive the image from the image capturing device 130. In detail, a plurality of types of the accessory and the type of the user body part corresponding to each type of the accessory are stored in a memory (not illustrated) in the display system 100. The computing device 110 can determine whether the accessory is the candidate device through the corresponding relation between the type of the accessory and the type of the user body part.

For example, the computing device 110 may establish a look-up table, and a plurality of types of the accessory and the corresponding types of the user body part are recorded in the look-up table. The look-up table can be stored in the memory in the display system 100. Table 1 below is an example of the look-up table in an exemplary embodiment, which is used to record the corresponding relation between the type of the accessory and the type of the user body part.

TABLE 1

| accessory | user body part |
|---|---|
| wrist controller | left hand |
|  | right hand |
| handheld controller | left hand |
|  | right hand |

On the other hand, the accessory is determined to be the candidate device when the accessory is applicable to the user body part. Concretely, in response to the accessory is applicable to the user body part according to the type of accessory and the type of the user body part, the computing device 110 obtains a first position of the accessory 140 within an environment and obtains a second position of the user body part within the environment (step S208). For example, according to FIG. 3, FIG. 4 and Table 1, the computing device 110 can input the type "wrist controller" corresponding to the wrist controller 38 and the type "right hand" corresponding to the hand image 40 to Table 1, and determine whether the wrist controller 38 is the candidate device which matches the hand image 40. In Table 1, the type "wrist controller" is recorded to be related to the type "right hand". Therefore, the computing device 110 would determine the wrist controller 38 and the hand image 40 have the corresponding relation, and set the wrist controller 38 to be the candidate device.

In one embodiment, the first position of the accessory 140 may include a location of the accessory 140 within the environment. For example, the location of the accessory 140 within the environment may be obtained by the computing device 110 based on a spatial relationship between the image capturing device 130 and the accessory 140. The image capturing device 130 may detect the infrared light emitted from the accessory 140, and the computing device 110 can calculate the location of the accessory 140 within the environment based on the infrared light obtained by the image capturing device 130, the location of the image capturing device 130, extrinsic parameters of the image capturing device 130, intrinsic parameters of the image capturing device 130 and/or other information. The location of the accessory may be a relative position related to a specific device (e.g. the image capturing device 130 or the HMD 120) or an absolute position corresponding to a coordinate system in the 3D space.

In another embodiment, the first position of the accessory 140 may further include an orientation of the accessory. For example, the orientation of the accessory 140 within the environment may be obtained by using an accelerometer. The location of the accessory 140 within the environment and the orientation of the accessory 140 may further be obtained based on information received by one or more additional sensor components (not illustrated), such as other positional sensors (e.g. motion sensors, GPS sensors, etc.) and/or orientation sensors (e.g. gyroscope, etc.) which can track the position and/or the orientation of the accessory 140.

In one embodiment, the second position of the user body part may include a location of the user body part within the environment and/or an orientation of the user body part. For example, the location of the user body part within the environment may be obtain by the computing device 110 based on a spatial relationship between the HMD 120 and the user body part. As mentioned above, the computing device 110 can perform image recognition on the image captured by the image capturing device 130, so as to define the reference point of the user body part in the image. In this embodiment, the computing device 110 can further convert the coordinates of the reference point in the image into the location within the environment.

In addition, the computing device 110 can perform image recognition on the image captured by the image capturing device 130, so as to determine the orientation of the user body part. It should be mentioned that in an embodiment, the location and the orientation may be a relative position related to a specific device (e.g. the HMD 120) or an absolute position corresponding to a coordinate system in the 3D space.

In another embodiment, the second position of the user body part within the environment may further be obtained based on skeleton information or other information received by one or more additional sensor components, which is not limited by the application. In detail, the computing device 110 can perform skeleton detection or other user body part recognition method on the received image to detect the skeleton information of the user, and define the candidate area of the user body part in the image based on the skeleton information. Then, the computing device 110 can further convert the coordinates of the candidate area in the image into the location of the user body part within the environment. Also, the computing device 110 can calculate the orientation of the user body part based on the skeleton information and inverse kinematics (IK).

Finally, the computing device 110 determines whether a relative position relation between the first position and the second position conforms a preset condition (step S210). In response to the relative position relation determined to be not conforming the preset condition, the procedure would return to step S204 such that the computing device 110 would continue to receive the image from the image capturing device 130.

On the other hand, in response to the relative position relation determined to be conforming the preset condition, the computing device 110 configures the accessory 140 to pair the user body part according to the first position of the accessory and the second position of the user body part (step S212). Here, the preset condition may indicate, for example, relative location relation and/or relative orientation relation between the accessory 140 and the user body part. However, the condition to be conformed by the relative position relation is not limited thereto. In detail, the computing device 110 may calculate a distance between the location of the accessory 140 and the location of the user body part to determine the relative location relation, and determine whether the relative location relation conforms the preset condition. However, the preset condition may be a distance or a distance range between the accessory 140 and the user body part.

In an embodiment, assume that the preset condition includes "the location of the wrist controller is 10 cm behind the right hand" and/or "the orientation of the wrist controller is the same as the orientation of the right hand". Referring to FIG. 3 and FIG. 4, the reference point P1 represents the location of the hand image 40 corresponding to the right hand of the user 32 and the reference point P2 represents the location of the wrist controller 38. The computing device 110 would calculate a distance between the reference point P1 and reference point P2 to determine the relative location relation between the reference point P1 and reference point P2, and determine whether the relative location relation conforms the preset condition. As shown in FIGS. 3 and 4, the distance between the reference point P1 and the reference point P2 is distance d1. Assume the distance d1 is 10 cm. According, the relative location relation can be determined to be conforming the preset condition in this embodiment, the computing device 110 can pair the wrist controller 38 to the right hand of the user 32.

In another embodiment, the relative orientation is further considered. The computing device 110 can calculate a relative angle between the orientation of the accessory and the orientation of the user body part between the accessory and the user body part. Concretely, the computing device 110 calculates a relative angle between the orientation of the accessory and the orientation of the user to determine the relative orientation between the accessory and the user body part, and determines whether the relative orientation conforms the preset condition. However, the preset condition may be a relative angle or a relative angle range between the accessory 140 and the user body part.

As shown in FIGS. 3 and 4, the computing device 110 can calculate a relative angle to determine the relative orientation between the hand image 40 corresponding to the right hand of the user 32 and the wrist controller 38, and determine whether the right hand of the user 32 and the wrist controller 38 have the same orientation. Assuming both orientation of the wrist controller 38 and the right hand of the user 32 are in a first direction D1, the computing device 110 can pair the wrist controller 38 to the right hand of the user 32.

The disclosure is further directed to a non-transitory computer-readable recording medium configured to record a program which is loaded by a processor in a computing device 110 to execute each step of the method for accessory pairing. The computer program is composed of a plurality of program sections (for example, building an organization diagram program section, approving a list program section, setting a program section, and deploying a program section, etc.). After the program sections are loaded in the computing device 110 and executed, the steps of the method for accessory pairing can be completed.

In view of the aforementioned descriptions, the proposed method, the system and the computer-readable recording medium for accessory pairing allow pairing the accessory and the user body part based on the type and the position of the accessory and the user body part. Based on identification results of the image tracking or the skeleton tracking corresponding to the position where the accessory is worn and positioning information of the accessory, it is inferred which body part the accessory is worn on. Then, the accessory can be paired to the body part where it is worn on. Thus, it does not require the user to set the pairing body part associated to each accessory, so as to improve the convenience and the flexibility of accessory setting.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An accessory pairing method, comprising:
   determining a type of the accessory based on the identifying information of an accessory;
   recognizing a type of a user body part according to an image;
   in response to the accessory is applicable to the user body part according to the type of accessory and the type of the user body part, obtaining a first position of the accessory within an environment and obtaining a second position of the user body part within the environment;
   configuring the accessory to pair the user body part according to the first position of the accessory and the second position of the user body part;
   defining a candidate area of the user body part corresponding to a user in the image;
   defining a first reference point to indicate a first location of the user body part within the environment based on the candidate area;
   defining a second reference point to indicate a second location of the accessory within the environment; and
   wherein the configuring the accessory to pair the user body part further comprising:
      comparing a distance with a preset condition, wherein the distance is a distance between the first reference point and the second reference point.

2. The method according to claim 1, wherein the step of determining the type of the accessory based on the identifying information comprises:
   obtaining an accessory type information from the identifying information of the accessory, wherein the accessory type information indicates a function of the accessory; and
   determining the type of the accessory based on the accessory type information.

3. The method according to claim 1, wherein the step of recognizing the type of the user body part in the image comprises:
   performing an image recognition on the image to recognize the type of the user body part in the image.

4. The method according to claim 1, further comprises:
   converting coordinates of the reference point in the image into the location of the user body part within the environment.

5. The method according to claim 1, wherein the first position of the accessory comprises at least one of a location of the accessory and an orientation of the accessory, and the second position of the user body part comprises at least one of a location of the user body part and an orientation of the user body part.

6. The method according to claim 5, wherein after the step of obtaining the first position of the accessory within the environment and obtaining the second position of the user body part within the environment, further comprises:

calculating a distance between the location of the accessory and the location of the user body part.

7. The method according to claim 5, wherein after the step of obtaining the first position of the accessory within the environment and obtaining the second position of the user body part within the environment, further comprises:
calculating a relative angle between the orientation of the accessory and the orientation of the user body part between the accessory and the user body part.

8. A display system for accessory pairing, comprising:
a head-mounted display (HMD);
at least one accessory; and
a computing device, coupled to the HMD and the accessory,
wherein the computing device is configured to determine a type of the accessory based on the identifying information of the accessory,
the computing device is configured to recognize a type of a user body part according to an image,
in response to the accessory is applicable to the user body part according to the type of accessory and the type of the user body part, the computing device is configured to obtain a first position of the accessory within an environment and obtaining a second position of the user body part within the environment, and
the computing device is configured to:
configure the accessory to pair the user body part according to the first position of the accessory and the second position of the user body part,
define a candidate area of the user body part corresponding to a user in the image,
define a first reference point to indicate a first location of the user body part within the environment based on the candidate area,
define a second reference point to indicate a second location of the accessory within the environment, and
compare a distance with a preset condition, wherein the distance is a distance between the first reference point and the second reference point.

9. The display system according to claim 8, wherein the computing device is configured to obtain an accessory type information from the identifying information of the accessory, wherein the accessory type information indicates a function of the accessory, and
the computing device is configured to determine the type of the accessory based on the accessory type information.

10. The display system according to claim 8, wherein the computing device is configured to perform an image recognition on the image to recognize the type of the user body part in the image.

11. The display system according to claim 8, wherein the computing device is configured to convert coordinates of the reference point in the image into the location of the user body part within the environment.

12. The display system according to claim 8, wherein the display system further comprises an image capturing device, coupled to the computing device, wherein the image capturing is configured to capture the image and transmit the image to the computing device.

13. The display system according to claim 8, wherein the first position of the accessory comprises at least one of a location of the accessory and an orientation of the accessory, and the second position of the user body part comprises at least one of a location of the user body part and an orientation of the user body part.

14. The display system according to claim 13, wherein after obtaining the first position of the accessory within the environment and obtaining the second position of the user body part within the environment, the computing device is further configured to calculate a distance between the location of the accessory and the location of the user body part.

15. The display system according to claim 13, wherein after obtaining the first position of the accessory within the environment and obtaining the second position of the user body part within the environment, the computing device is further configured to calculate a relative angle between the orientation of the accessory and the orientation of the user body part between the accessory and the user body part.

16. A non-transitory computer-readable recording medium, configured to record a program, wherein the program is loaded by a processor in a computing device to execute following steps:
determining a type of the accessory based on the identifying information of an accessory;
recognizing a type of a user body part according to an image;
in response to the accessory is applicable to the user body part according to the type of accessory and the type of the user body part, obtaining a first position of the accessory within an environment and obtaining a second position of the user body part within the environment;
configuring the accessory to pair the user body part according to the first position of the accessory and the second position of the user body part;
defining a candidate area of the user body part corresponding to a user in the image;
defining a first reference point to indicate a first location of the user body part within the environment based on the candidate area;
defining a second reference point to indicate a second location of the accessory within the environment; and
wherein the configuring the accessory to pair the user body part further comprising:
comparing a distance with a preset condition, wherein the distance is a distance between the first reference point and the second reference point.

* * * * *